United States Patent [19]

Arai

[11] Patent Number: 4,889,601
[45] Date of Patent: Dec. 26, 1989

[54] SELECTIVE ABSORPTION FILM OF A SOLAR HEAT COLLECTOR

[75] Inventor: Nobushige Arai, Kitakatsuragi, Japan

[73] Assignee: Sharp Kabushiki Kaisha, Osaka, Japan

[21] Appl. No.: 227,115

[22] Filed: Aug. 2, 1988

Related U.S. Application Data

[62] Division of Ser. No. 903,787, Sep. 5, 1986, Pat. No. 4,777,936, which is a division of Ser. No. 530,264, Sep. 8, 1983, Pat. No. 4,637,374.

[30] Foreign Application Priority Data

| Sep. 8, 1982 | [JP] | Japan | 57-156429 |
| Sep. 24, 1982 | [JP] | Japan | 57-166857 |
| Nov. 30, 1982 | [JP] | Japan | 57-210357 |
| Nov. 30, 1982 | [JP] | Japan | 57-181732 |

[51] Int. Cl.$^4$ .......................... F24J 2/48; C25D 5/50
[52] U.S. Cl. ................... 204/37.1; 126/901; 204/40
[58] Field of Search ............... 204/35.1, 40, 37.1

[56] References Cited

U.S. PATENT DOCUMENTS

| 3,920,413 | 11/1975 | Lowery | 428/629 |
| 3,944,440 | 3/1976 | Franz | 148/276 |
| 4,177,325 | 12/1979 | Roberts et al. | 428/629 |
| 4,186,725 | 2/1980 | Schwartz | 126/443 |
| 4,206,248 | 6/1980 | Schmidlin | 427/27 |
| 4,211,210 | 7/1980 | Muenker et al. | 126/438 |
| 4,637,374 | 1/1987 | Arai | 126/417 |

FOREIGN PATENT DOCUMENTS 58-178148 10/1958 Japan.
58-158456 9/1983 Japan.

OTHER PUBLICATIONS

F. A. Lowenheim, Electroplating, McGraw—Hill Book Co., N.Y., 1978, pp. 218–219, 341–345.

Primary Examiner—John F. Niebling
Assistant Examiner—William T. Leader
Attorney, Agent, or Firm—Birch, Stewart, Kolasch & Birch

[57] ABSTRACT

A selective absorption film for selectively absorbing solar rays is composed mainly of cobalt oxide. A blue system selective absorption film having high heat resistance at high temperatures is provided by coating one surface of a metal material of iron or copper with cobalt, and treating the cobalt layer in a furnace in an oxidizing atmosphere for a desired time, while supplying water vapor into the furnace which is kept in an oxidizing atmosphere so as to carry out an oxidation treatment.

14 Claims, 3 Drawing Sheets

FIG.1
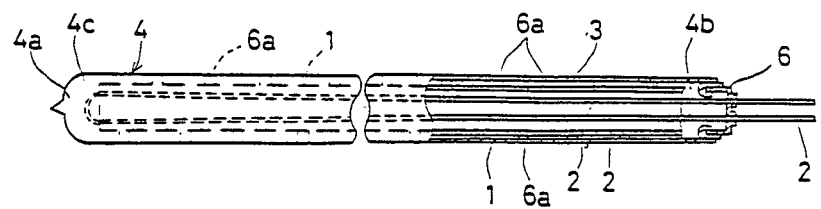
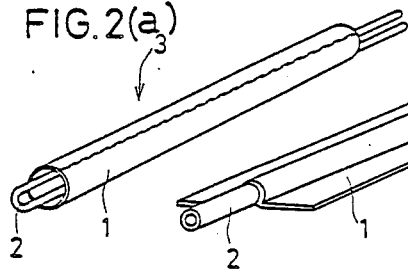
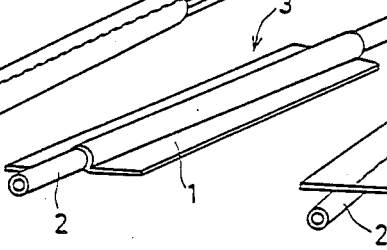
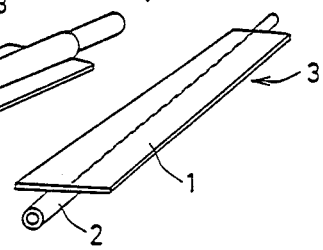
FIG.3
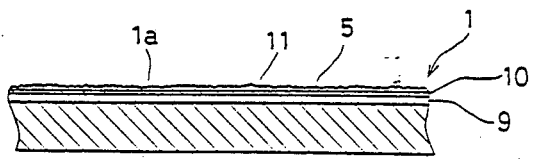

4,889,601

SELECTIVE ABSORPTION FILM OF A SOLAR HEAT COLLECTOR

This application is a divisional of copending application Serial No. 06/903,787, filed on Sept. 5, 1986, now U.S. Pat. No. 4,777,936, which is a divisional of application Serial No. 06/530,264, 09/08/83 now U.S. Pat. No. 4,637,374.

BACKGROUND OF THE INVENTION

The present invention relates to a solar heat collector, and more particularly to a selective absorption film formed on a heat collection plate of a solar heat collector.

Conventionally, metal members such as aluminum, copper, iron, and the like, which have good thermal conductivity properties, have been used as materials for heat collection fins of solar heat collectors, and metal members having a black film such as black nickel, black chromium, copper oxide, iron oxide, and the like have been practically employed.

In a solar heat collector that includes a heat collection tube and a heat collection fin sealed in a hollow cylinder of transparent glass, a heat collection fin having a high absorption rate $\alpha$ of solar rays and a surface with a low radiation rate $\epsilon$ is generally necessary so as to collect the solar heat efectively. Particularly, a surface lower radiation rate $\epsilon$ and a selective absorption film higher absorption rate $\alpha$ are required for conventionally used vacuum hollow cylinder type solar heat collectors.

Further, it is desirable tha the absorption rate $\alpha$ be high in air outside vacuum as in conventional flat plate type solar heat collectors, and that the radiation rate $\epsilon$ below. However, it is difficult to mount a heat collection fin having a radiation rate $\epsilon$ of below 0.10 and a absorption rate $\alpha$ of above 0.90 on a vacuum hollow cylinder type solar heat collector, since a selective absorption film of black nickel, which is produced by electrolytically coloring an anodic oxidation film of an aluminum plate as conventionally employed, as an absorption rate $\alpha$ of 0.87 to 0.92 and a radiation rate $\epsilon$ of 0.12 to 0.20 under mass production. These characteristics are unsatisfactory for vacuum hollow cylinder type solar heat collectors.

SUMMARY OF THE INVENTION

One object of the present invention is to provide a selective absorption film having excellent heat resistance and superior heat absorption which is applied to a heat collection plate for a solar heat collector.

Another object of the present invention is to provide a method of producing a vacuum glass tube type heat collector having a high absorption rate and lower manufacturing costs by forming a selective absorption film of cobalt oxide on a surface of a heat collection body composed of a copper material.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

According to one embodiment of the present invention, a solar heat collector comprises a heat collection member including a heat collection tube joined to a heat collection fin and being vacuum sealed in a transparent hollow cylinder, and a selective absorption film for selectively absorbing solar heat on a heat collection surface of the heat collection fin, the selective absorption film being composed mainly of cobalt oxide.

According to another embodiment of the present invention, a heat collection film of a solar heat collector is formed by covering one surface of a metal plate of iron or copper with cobalt, placing the metal plate in an oxidation furnace, and oxidizing the cobalt film in an oxidizing atmosphere of water vapor at a temperature of 350° to 400° C. for 30 to 120 minutes, thereby producing a blue system selective absorption film having good heat resistance at high temperature.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a cross-sectional view of a solar heat collector showing one embodiment of the present invention;

FIG. 2 (a)(b) and (c) are perspective views of heat collectors comprised of a heat collection fin and a heat collection tube;

FIG. 3 is a cross-sectional view of the heat collection fin;

DETAILED DESCRIPTION OF THE INVENTION

Figure 4:
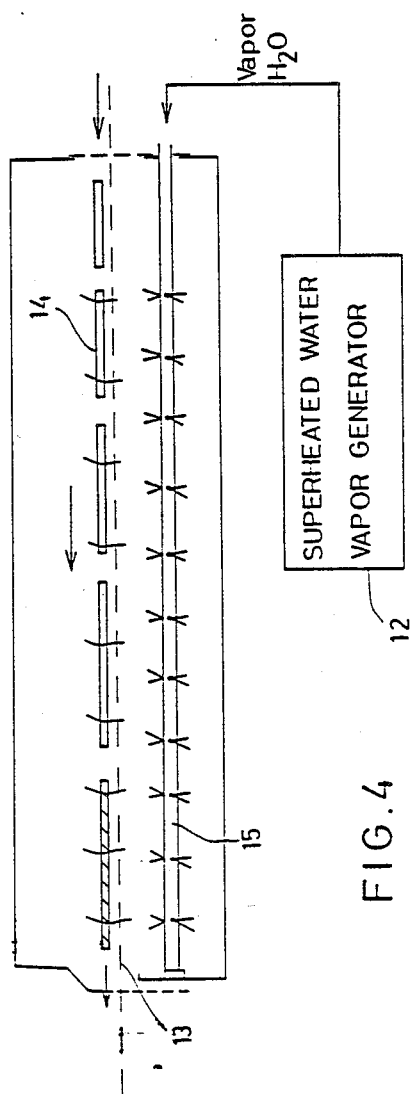
FIG. 4 is a view of a heat-treating furnace for explaining a method of making a selective absorption film according to the present invention.

A solar heat collector according to one embodiment of the present invention is shown in FIG. 1. A heat collection member 3, comprised of a heat collection tube joined to a heat collection fin 1, is vacuum sealed in a transparent hollow cylinder 4. A selective absorption film 5 for selectively absorbing solar rays is provided on a heat collection surface 1a of the heat collection fin 1. The selective absorption film 5 is composed mainly of cobalt oxide.

The heat collection tube 2 is bent in the form of U-shaped structure, one side of which is welded to an inner wall of a cylindrical heat collection fin 1 which is received through supports 6a in a hollow cylinder 4 made of transparent glass. The hollow cylinder 4 is enclosed at one end 4a by welding and at the other end 4b by a sealing metal member 6, thereby vacuum sealing the hollow cylinder 4.

Further, the heating collection fin 1 is made of iron and the plate thickness is about 0.4 to 0.6 mm. The selective absorption film 5 is constituted by a laminate which comprises a nickel plated layer 9 having a thickness of several microns to several tens of microns and formed on the heat collection surface 1a of the heat collection fin 1, a cobalt plated layer 10 containing an iron component and having a thickness of several microns, and a cobalt oxide layer 11 (referring to FIG. 3). The heat collection fin 1 may be also made of copper.

As a heat collection fin 1, either a metal plate having at a center a recessed portion for attaching the heat collection tube thereto as shown in FIG. 2(b) or a metal plate as shown in FIG. 2(c) may be employed except the cylindrical structure to which U-shaped heat collection tube 2 is fixed at one side by welding as shown in FIG. 2(a).

A method of making the selective absorption film according to the present invention is carried out by forming a nickel plated layer on a surface of a metal plate of iron or copper, forming a cobalt plated layer on the nickel plated layer, or covering one surface of the metal plate of iron or copper with a cobalt plated layer, and oxidizing the cobalt layer by a heat-treatment to obtain a selective absorption film of another metal oxide mixture which is composed mainly of CoO and $Co_3O_4$, or CoO and $Fe_2O_3$ and which endures a high temperature up to 400° C.

In order to produce a selective absorption film having good heat resistance at a high temperature as described above, the oxidation treatment is a key point. Of course, the selective absorption film is affected by the finished condition of the cobalt plating.

When the metal plate of iron, for example, is subjected to the plating treatment, it is accomplished by the procedure of treating processes for the selective absorption film of iron plate according to the embodiment of the present invention described below.

In this case, the formed article of iron plate is applied to the heat collection fin. Further, in this case nickel plating and cobalt plating are carried out, but the process of nickel plating may be omitted when only the cobalt plating is accomplished. However, the nickel plating may be usually provided for achieving durability and corrosion resistance of the selective absorption film.

With respect to the cobalt plating, the composition of the cobalt plating bath and the treating condition, as shown in Table 2 to be described later as an embodiment of the present invention, may be preferable. Particularly, in order to obtain a selective absorption film having good heat resistance at high temperature and rendering an absorption rate $\alpha$ of solar rays of 93 to 96% and a radiation rate $\epsilon$ of 10 to 6%, which ensure an absorption rate $\alpha$ of above 90% and a radiation rate $\epsilon$ of below 10%, a bath containing an iron component as an additive, for example, $Fe_2(SO_4)_3$ 7 $H_2O$ in the cobalt plating bath may be preferable. When an iron component additive is not used, the oxide film formed by the oxidation treatment during mass production may be widely varied, and the characteristics the selective absorption film may not be stabilized. Therefore, it may be difficult to ensure a selective absorption film having good $\alpha$ and $\epsilon$ values. That is, a cobalt blue coloration of the selective absorption film may not often be seen by the oxidation treatment of the cobalt plated layer without using the iron component. In this case, $\alpha$ the thermal absorption characteristic may not exceed 90% and may become 85 to 87% at the most. A brown uniform film containing Fe component can be obtained on the surface which is subjected to the cobalt plating treatment using the composition of the cobalt plating bath containing the iron component, thereby providing the blue system colored selective absorption film having good heat resistance at high temperature by means of the oxidation treatment according to the present invention. A similar absorption film can also be obtained when the copper plate is employed.

One embodiment of the present invention for making the selective absorption film will be described with a drawing and the Tables in case of forming a selective absorption film on the heat collection fin of the solar heat collector made of iron or copper plate.

The heat collection fin 1 as shown in FIGS. 2 (a) to (c) is treated until the final thermal oxidation process for the selective absorption film using iron or copper plate.

Treating Processes for Selective Absorption Film Using Iron or Copper Plate. Iron material or formed article of copper material (heat collection fin)→defatting→washing with water→pickling→washing with water→removal of water→(2) luster nickel plating-→washing with water→removal of water→(3) cobalt plating→washing with water→removal of water, drying→(4) thermal oxidation treatment (production of dry type oxide film for selective absorption film).

The luster nickel plating described above is accomplished with a luster nickel plating bath and under conditions shown in the following Table 1.

TABLE 1

| Composition of Luster Nickel Plating Bath and Conditions | |
|---|---|
| (Composition of Bath) | |
| Nickel sulfate | 240 g/liter |
| Nickel chloride | 45 g/liter |
| Boric acid | 30 g/liter |
| Naphthalenedisulfonic acid soda | 5 to 7 g/liter |
| 40% solution of hormalin | 1 to 2.5 cc/liter |
| Cobalt sulfate | 0 to 10 g/liter |
| Water | |
| (Conditions) | |
| PH | 4.0 to 5.0 |
| Temperature | 40 to 45° C. |
| Current density | 2 to 4 A/dm$^2$ |
| Time | 30 to 90 seconds (60 seconds) |

The cobalt plating (3) described above is accomplished by using a composition of a cobalt plating bath and the conditions shown in the following Table 2.

TABLE 2

| Compositions of Cobalt Plating Bath and Condition | |
|---|---|
| (Composition of Bath) | |
| Cobalt sulfate | 450 Kg/m$^3$ |
| Cobalt chloride | 45 Kg/m$^3$ |
| Boric acid | 40 Kg/m$^3$ |
| Water | 8 Kg/m$^3$ of $Fe_2(SO_4)_3$.7 $H_2O$ is added when iron component is added. |
| (Conditions) | |
| PH | 1.5 to 2.3 |
| Temperature | 55° C. |
| Current density | 400 A/m$^2$ |
| Time | 30 to 120 seconds (60 to 90 seconds) |

The thermal oxidation treatment (4) described above is carried out through a heat-treating furnace as shown in FIG. 4. That is, cobalt plated finished articles 14, on which a selective absorption film is produced, are transferred through the furnace in the direction of the arrow shown in FIG. 4. While supplying $H_2O$ vapor from a superheated water vapor generator 12 to nozzles 15 arranged under the articles 14, $H_2O$ vapor is applied to the cobalt plated finished articles 14 to be treated, which are placed on a conveyor 13. The furnace is maintained in an air heating type opened normal pressure air oxidation atmosphere at 350° to 400° C.

The following shows the treating conditions described above.

(Treating Conditions)

Atmosphere: Air oxidizing atmosphere: 1 atmosphere
Opened air heating type (gas furnace generating $H_2O$ may be preferable)
Temperature: 350° to 400° C. (350° to 370° C. for 1 Hr)
Time: 30 minutes to 2 hours. For the purpose of uniform oxidation treatment, it is necessary that dusts, finger marks and the like do not adhere to the articles.

In this case in order to obtain a heat resisting selective absorption film with stabilized quality, the treating temperature may be preferably be about 350° to 370° C., and the treating time may be about 1 hour.

The following Table 3 shows the valuation of $\alpha$ and $\epsilon$ for selective absorption films produced by various treating conditions.

TABLE 3

|  | Absorption rate ($\alpha$) | Radiation rate ($\epsilon$) |
| --- | --- | --- |
| Selective absorption film of cobalt according to present invention (in superheated water vapor at 350 to 400° C. for 30 minutes to 2 hours). | 0.91 to 0.96 | 0.1 to 0.08 |
| Oxidation in air heating type drying furnace at 400° C. for 2 hours. | 0.78 to 0.81 | 0.08 to 0.075 |
| Oxidation in air heating type drying furnace at 400° C. for 30 minutes. | 0.78 to 0.81 | 0.08 to 0.075 |
| Oxidation in air heating type drying furnace at 400° C. for 4 hours. | 0.78 to 0.81 | 0.08 to 0.075 |
| Oxidation in air heating type drying furnace absorbing air at 400° C. for 2 hours. | 0.86 to 0.87 ∫ 0.92 to 0.93 | 0.08 to 0.09 ∫ 0.13 to 0.16 |

It is apparent from Table 3 that the cobalt-plated blue system colored selective absorption film, treated in an oxidizing air atmosphere of water vapor at 350° to 400° C. for 30 to 120 minutes, exhibits good characteristics.

Since the selective absorption film is produced by the described method, it can be manufactured at a lower cost. In addition, the selective absorption film has good durability at a high temperature and is suitable for improving the heat collection efficiency of the heat collection fin for solar heat collectors.

Another one embodiment for making a heat collection fin of the present invention will be described.

Figure 5:
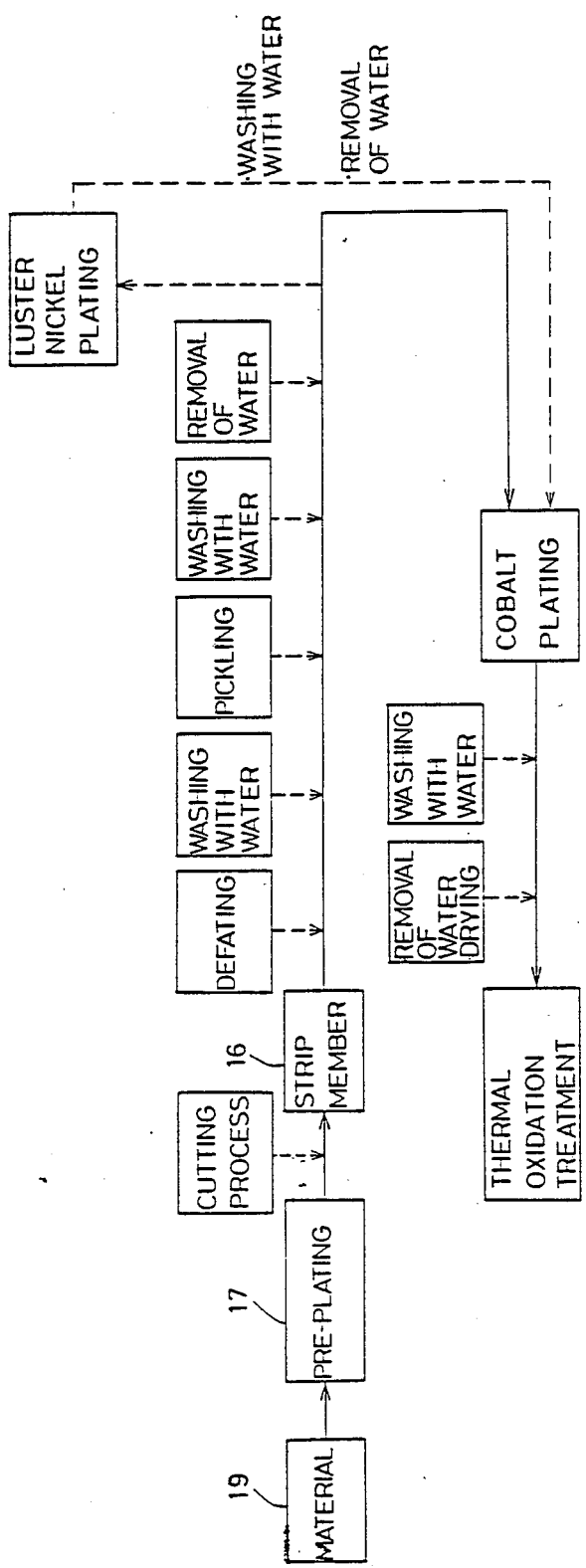
FIG. 5 is a view for another manufacturing process for a selective absorption film of a heat collection fin.

Referring to FIG. 5, a coil-shaped material 19 of copper or steel plate is plated with nickel or copper with unit of several tons, thereby producing a pre-plating layer 17 thereon. Although the pre-plating is generally carried out by electrical plating, chemical plating, vacuum deposition, sputtering, metallizing and the like can also be employed. After the material 19 with the pre-plating layer is cut into a size corresponding to one heat collection fin, the resulting strip is subjected to mechanical machining such as roll forming, curring, pressing, and the like, or welding, thereby providing a strip member 16 used as the heat collection fins shown in FIGS. 2 (a) (b) and (c). Thereafter, processes of defatting, washing with water, pickling with a weak acid bath, washing with water removing the water are successively accomplished. A cobalt plating treatment is then carried out under the composition of the bath and the conditions shown in Table 2, thereby forming a cobalt plated layer 10 on the pre-plating layer as shown in FIG. 3.

The strip member 16 with the cobalt plated layer 10 thus obtained is successively subjected to the processes of washing with water, removing the water and drying, and then subjecting to to a thermal oxidation treatment to produce a selective absorption film 5 thereon. The thermal oxidation treatment is carried out in an air atmosphere at 300° to 400° C. at one atmospheric pressure for 30 minutes to 2 hours by using an opened air heating furnace (a gas furnace for generating $H_2O$ may be employed). In this case, in order to accomplish a uniform oxidation treatment, it is necessary that dust, finger marks and the like do not adhere to the plated layer. After the heat collection fin thus obtained is joined to the heat collection tube 2, the assembly is received in the hollow cylinder 4 to complete the solar heat collector.

As a method of producing the heat collection fin 1 by subjecting the material 19 to copper plating serving as pre-plating, cobalt plating is accomplished after the processes shown by the dotted lines of FIG. 5 have been done. That is, the material 19 after pre-plating, is cut into a size corresponding to one heat collection fin, thereby providing the strip member 16. The strip member is successively subjected to processes of defatting, washing with water, pickling with weak acid bath, washing with water, and removing the water. A luster nickel plating treatment acting as the pre-plating is then carried out by using the bath and the conditions shown in Table 1. After the processes of washing with water and the removing of water are carried out, cobalt plating is accomplished in the same manner as described above and the cobalt plated layer is subjected to a thermal oxidation treatment.

As described above, when several tons of cold rolled steel coil or copper plate coil is subjected to the continuous nickel plating or copper plating treatment, the adhesive fault of the plated layer to the material will be eliminated and the product will be free from the peeling of the plated layer due to defatting fault. Consequently, the final fault rate will be lowered to below 1% while the conventional faulty rate is about 5 to 10%, thereby remarkably reducing the fault rate. Further, as the pre-plating is accomplished under the condition of the material 19, the time required for the pre-plating treatment can be greatly decreased as compared with a known process in which the pre-plating is carried out after cutting the material, thereby remarkably reducing the cost of the plating treatment. The selective absorption film 5, which is free from the plating quality, can be produced by using several tons of the coil-shaped material. Since the selective absorption film having stable heat collection characteristics, a high absorption rate of solar rays and a low radiation rate can be obtained, heat collection fins with high heat collection characteristics will be provided to improve the heat collection efficiency of solar systems.

According to the present invention, instead of joining the heat collection fin to the heat collection tube 2 after producing the selective absorption film on the hat collection fin as described in the embodiment, the cobalt plating and the thermal oxidation treatment may be accomplished after the strip member is joining to the heat collection tube. Thereafter, the assembly may be mounted to a header tube and the like to provide a solar heat collector. Further, the processes described above can be applicable to the production of a selective absorption film of black chromium except the selective absorption film of cobalt oxide.

As is evident from the explanation described above, according to another one embodiment of the a present invention, the pre-plating layer is formed on the surface of the material of metal plate, and the material is cut into the size corresponding to one heat collection fin, thereby producing a strip member. Thereafter, the pre-plating layer of the strip member is subjected to the surface treatment to provide the heat collection fin for solar heat.

Another method of producing a selective absorption film on a collector of a vacuum glass tube according to the present invention will be described.

Figure 6:
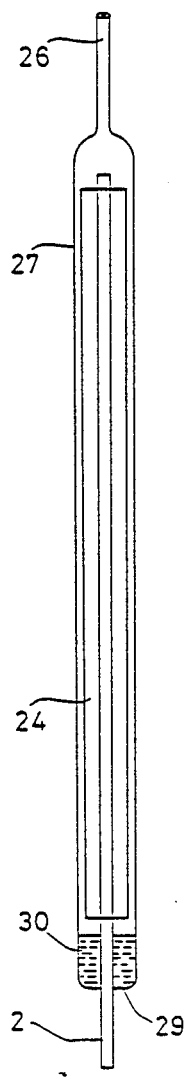
FIG. 6 is a view for explaining a method of making a selective absorption film in a vacuum glass tube type heat collector.

A heat collector body with a cobalt plated layer is first inserted into a glass tube as shown in FIG. 6. That is, a heat collector body 24, which is previously plated with cobalt, is introduced into a glass tube 27 having a vacuum exhaust aperture 26 at one end, and is sealed at the other end by a sealing metal member 29. Thereafter, the glass tube 27 is vertically positioned as shown in the drawing, and distilled water or water such as a 2 to 3% hydrogen peroxide solution is poured into the glass tube from the vacuum exhaust aperture 26. The glass tube 27 is placed in a vacuum exhausted furnace which is raised to 350° to 600° C. After the heat collection plate is maintained at 350° to 400° C. for about 5 to 20 minutes, a vacuum pump is actuated to evacuate the glass tube. Then, a selective absorption film due to the cobalt oxidation is produced on the collector body to color the cobalt blue.

According to this embodiment, since the heat treatment of the cobalt plated selective absorption film can be accomplished by using the heat generated in the evacuation treatment, reduction of the heat-treating temperature can be prevented, and unwanted corrosion and rust due to the dew produced by high humidity may be avoided. In addition, the evacuation treatment and the oxidation treatment can be carried out at the same time.

Although solar heat collectors have been described as embodiments of the present invention, the present invention should not be limited solely to these solar heat collectors.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of making a selective absorption film comprising:

forming a cobalt film on at least one surface of a metal article comprising iron or copper so as to form a cobalt coated article; and treating said article at an oxidizing temperature of from 350° to 400° C. for an oxidizing time period of from 30 to 120 minutes in a furnace containing an oxidizing atmosphere while supplying water vapor from a superheated water vapor generator to the furnace so as to carry out oxidation of said cobalt film thereby producing a selective absorption film having an absorption rate of from 0.91 to 0.96 and a radiation rate of from 0.08 to 0.10.

2. The method of claim 1, wherein said metal article comprises iron.

3. The method of claim 1, wherein said metal article comprises copper.

4. The method of claim 1, which further comprises forming a nickel plated layer on at least one surface of said metal article so that said cobalt film is formed on said nickel plated layer.

5. The method of claim 4, wherein said oxidizing temperature is from about 350° to 370° C. and said oxidation time period is about one hour.

6. The method of claim 4, wherein said nickel plated layer is formed by treating said metal article in a nickel plating bath which contains nickel salts in an aqueous solution.

7. The method of claim 6, wherein said nickel plating bath contains nickel sulfate, nickel chloride, boric acid, naphthalenedisulfonic acid soda, hormalin, and cobalt sulfate; said nickel plating bath has a pH of from 4.0 to 5.0, a temperature of from 40° to 45° C., and a current density of from 2 to 4 A/dm$^2$; and wherein said metal article is treated for a time period of from 30 to 90 seconds.

8. The method of claim 7, wherein said cobalt film is formed by treating said metal article in a cobalt plating bath containing cobalt salts in an aqueous solution.

9. The method of claim 1, wherein said oxidizing temperature is from about 350° to 370° C. and said oxidation time period is about one hour.

10. The method of claim 1, wherein said cobalt film is formed by treating said metal article in a cobalt plating bath containing cobalt salts in an aqueous solution.

11. The method of claim 10, wherein said cobalt plating bath further comprises an iron component.

12. The method of claim 11, wherein said iron component comprises hydrated $Fe_2(SO_4)_3$.

13. The method of claim 11, wherein said cobalt plating bath contains cobalt sulfate, cobalt chloride, and boric acid; said cobalt plating bath has a pH of from 1.5 to 2.3, a temperature of about 55° C., and a current density of about 400 A/m$^2$; and wherein said metal article is treated in said cobalt plating bath for a period of from 30 to 120 seconds.

14. The method of claim 10, wherein said cobalt plating bath contains cobalt sulfate, cobalt chloride, and boric acid; said cobalt plating bath has a pH of from 1.5 to 2.3, a temperature of about 55° C., and a current density of about 400 A/m$^2$; and wherein said metal article is treated in said cobalt plating bath for a period of from 30 to 120 seconds.

* * * * *